(12) United States Patent
Kim et al.

(10) Patent No.: US 9,442,284 B2
(45) Date of Patent: Sep. 13, 2016

(54) SUBSTRATE HAVING FLUID DAM ADAPTED FOR USE AN ELECTRO WETTING DISPLAY DEVICE

(71) Applicant: Samsung Display Co., LTD., Yongin, Gyeonggi-Do (KR)

(72) Inventors: Dong-Hwan Kim, Asan-si (KR); Sung-Ku Baek, Yongin-si (KR); Gil-Hwan Yeo, Hwaseong-si (KR); Tae-Woon Cha, Seoul (KR); Gyung-Mo Tahk, Seoul (KR)

(73) Assignee: Samsung Display Co., Ltd. (KR)

( * ) Notice: Subject to any disclaimer, the term of this patent is extended or adjusted under 35 U.S.C. 154(b) by 235 days.

(21) Appl. No.: 13/656,190

(22) Filed: Oct. 19, 2012

(65) Prior Publication Data
US 2013/0342889 A1 Dec. 26, 2013

(30) Foreign Application Priority Data
Jun. 21, 2012 (KR) .................. 10-2012-0066741

(51) Int. Cl.
*G02B 26/00* (2006.01)

(52) U.S. Cl.
CPC .................. *G02B 26/005* (2013.01)

(58) Field of Classification Search
CPC .. G02G 26/005; G02G 26/02; G02G 26/004; G02G 26/007; G09G 3/348

USPC .................. 359/290–298, 237–240
See application file for complete search history.

(56) References Cited

U.S. PATENT DOCUMENTS

| 5,838,482 A * | 11/1998 | Decroupet et al. ........... 359/253 |
| 7,339,715 B2 * | 3/2008 | Webber ................. C25D 13/00 359/296 |
| 2007/0163876 A1 * | 7/2007 | Weekamp ................. 204/247.4 |

FOREIGN PATENT DOCUMENTS

| KR | 20100110787 | 10/2010 |
| KR | 1020110074088 A | 6/2011 |

* cited by examiner

*Primary Examiner* — Bumsuk Won
*Assistant Examiner* — Tamara Y Washington
(74) *Attorney, Agent, or Firm* — Innovation Counsel LLP

(57) ABSTRACT

An electrowetting display device includes a first substrate comprising a wall pattern surrounding a pixel electrode disposed in a display area of the first substrate, a spaced apart second substrate comprising a common electrode and a dam member disposed in a peripheral area surrounding the display area. The dam member has sealable openings (a.k.a. sealable dam spillways) through which there is discharged an excess portion of an excessively supplied wetting layer, the discharge of the excess occurring while the first and second substrates are brought together about top and bottom portions of a sealing ring that seals them together.

12 Claims, 14 Drawing Sheets

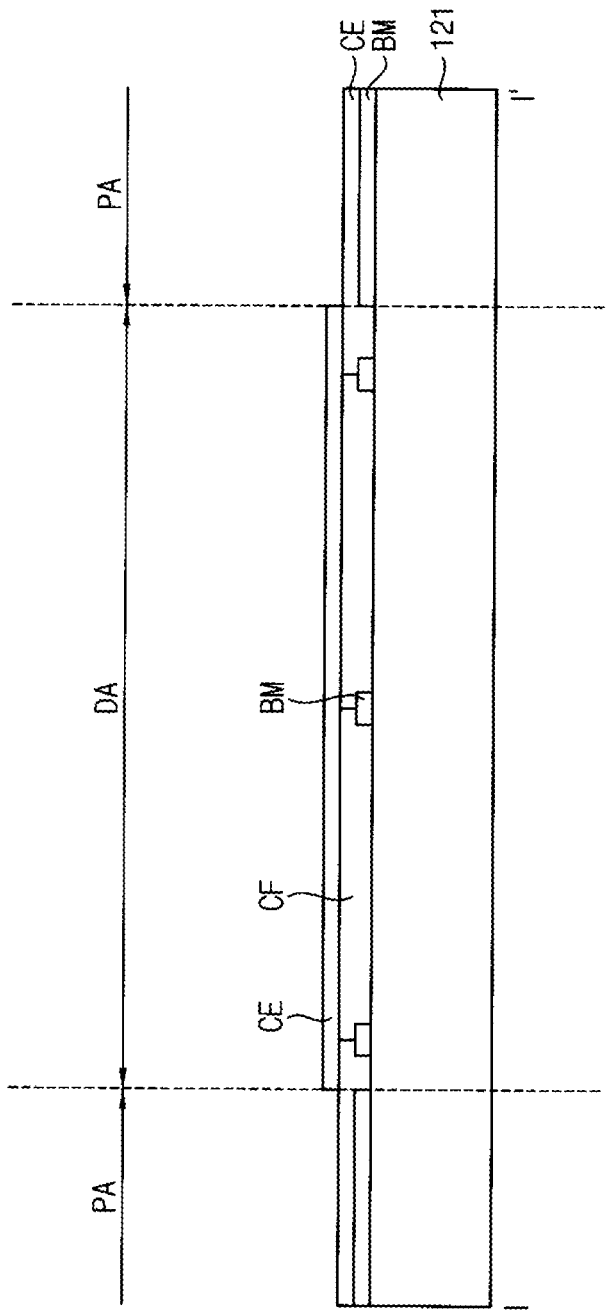

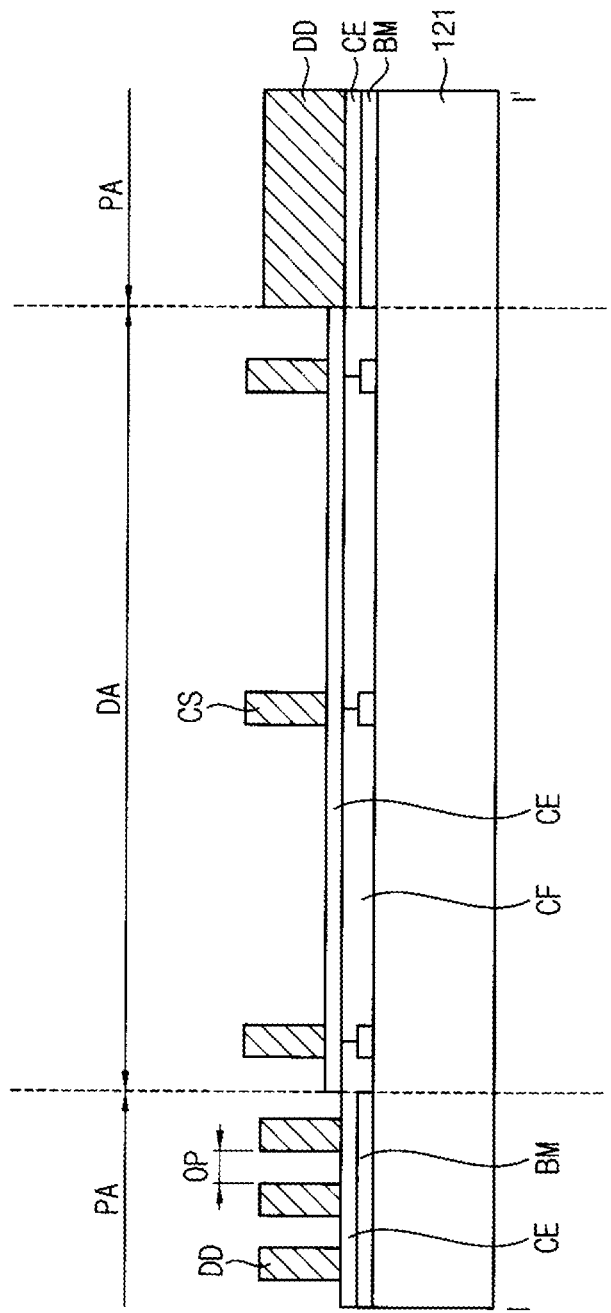

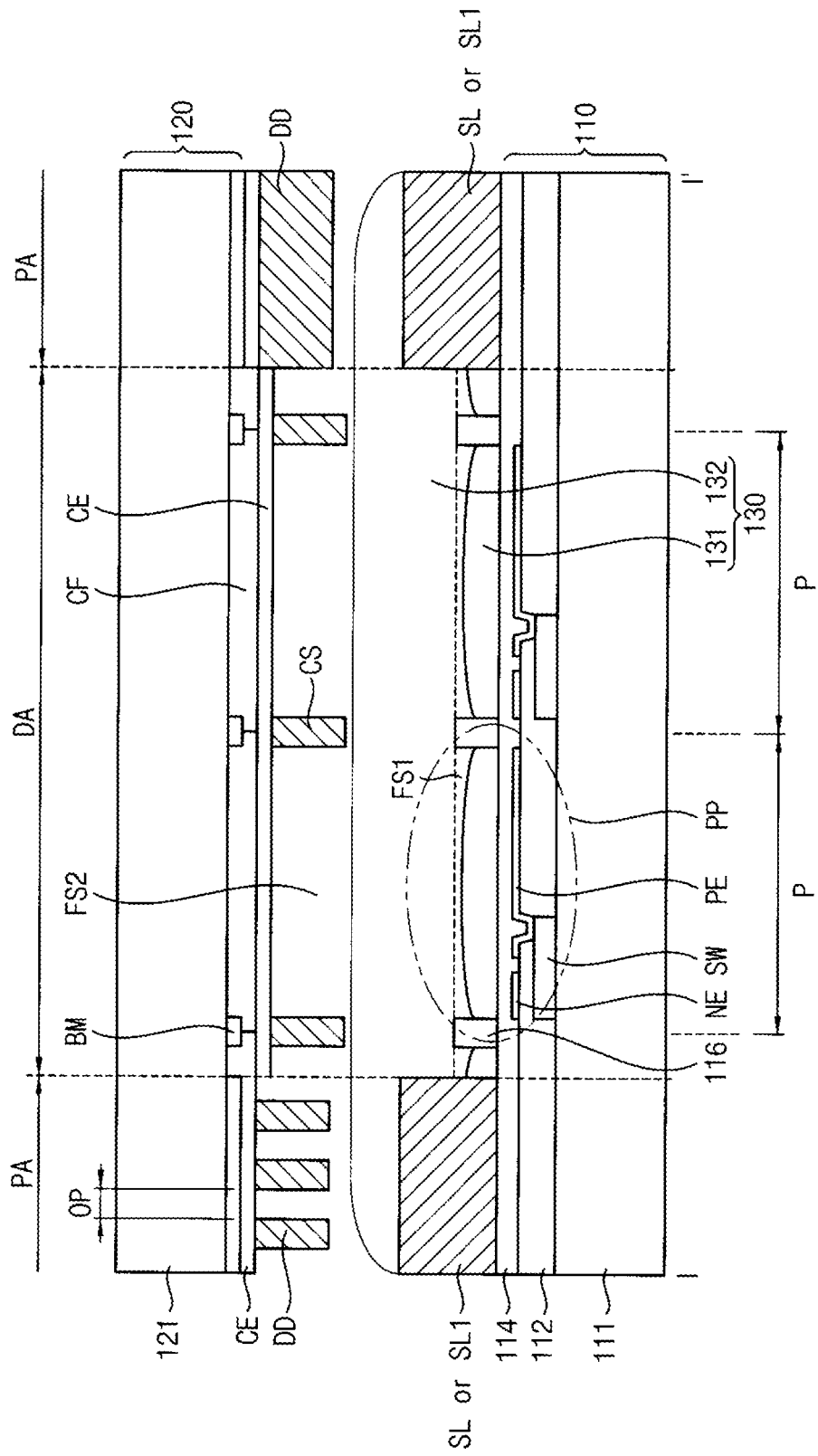

SUBSTRATE HAVING FLUID DAM ADAPTED FOR USE AN ELECTRO WETTING DISPLAY DEVICE

This application claims priority from and the benefit of Korean Patent Application No. 10-2012-0066741, filed on Jun. 21, 2012, which is hereby incorporated by reference for all purposes as if fully set forth herein.

BACKGROUND

1. Field of Disclosure

The present disclosure of invention relates to a substrate for an electrowetting display device. More particularly, the present disclosure relates to an electrowetting display device having improved reliability.

2. Description of Related Technology

An electrowetting display device displays a desired image by selectively displacing parts of plural fluid layers where the parts include a polar (e.g., hydrophillic) fluid and a nonpolar (e.g., hydrophobic) fluid. Generally, the electrowetting display device includes a first substrate on which a plurality of pixel electrodes are formed, a spaced apart second substrate on which a common electrode is formed, a hydrophillic (polar, and thus electrostatically movable) upper fluid layer is interposed between the first and second substrates, and discrete amounts of a nonpolar (e.g., hydrophobic) fluid are disposed at each of the pixel electrodes where at least one of the fluids is dyed. When an appropriate voltage is applied between a respective pixel electrode and the common electrode, a normal surface tension state of the polar (e.g., hydrophillic) upper fluid is overcome and it is displaced so that the adjacent nonpolar (e.g., hydrophobic) fluid is also moved to make way for the electrostatically displaced upper fluid and this causes the corresponding pixel to transmit or block a supplied light. Thus, the electrowetting display device may display an image.

Processes of manufacturing the electrowetting display device includes fully filling the fluid layers (where "fluid" here means liquid) into a filling space defined by a containerizing structure disposed on the first substrate and combining the first substrate and second substrate under pressure. During this pressurized combination process, an undesired bursting of a sealant which combines the first substrate with the second substrate may occur if there an excess of internal pressure in the filling space during the process of bonding together (combining) the substrates. In addition, if the sealant does not burst, a middle portion of the electrowetting display device may be undesirably bulged by a non-contact remnant of the combining pressure so that a cell gap of the electrowetting display device may be non-uniform across its display area.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides an electrowetting display device capable of keeping uniform a cell gap across its display area even if an excess of wetting fluid is applied during assembly of the electrowetting display device.

According to an exemplary embodiment, there is provided a first substrate comprising a wall pattern surrounding a pixel electrode and disposed in a display area of the device, a spaced apart second substrate comprising a common electrode, a sealing ring joining the first substrate to the second substrate and sealing in a whetting fluid interposed between the first and second substrate; and a dam member disposed in a peripheral area surrounding the display area and having sealable openings through which an excess amount of the whetting fluid can be discharged, where the whetting fluid includes a nonpolar first fluid layer and a polar second fluid layer.

In an exemplary embodiment, the dam member has a polygon shape with sides of the polygon being disposed in areas corresponding to four edges of the display area.

In an exemplary embodiment, wherein the dam openings each have a width of about 0.03 mm to about 1 mm.

In an exemplary embodiment, the electrowetting display device may further include a gap maintaining member maintaining a predetermined gap between the first substrate and the spaced apart second substrate.

In an exemplary embodiment, the gap maintaining member is disposed in the display area and aligned with the wall pattern.

In an exemplary embodiment, a height of the dam member is substantially the same as a height of the gap maintaining member.

In an exemplary embodiment, the first fluid layer includes a hydrophobic fluid and the second fluid layer comprises a hydrophillic fluid.

In an exemplary embodiment, the first fluid layer is disposed in a first filling space which is formed by the wall pattern and the second fluid layer is normally disposed in a second filling space formed by the gap maintaining member.

According to still another exemplary embodiment, there is provided a first substrate comprising a wall maintaining pattern surrounding a pixel electrode disposed in a display area and a dam member disposed in a peripheral area surrounding the display area. The wall maintaining pattern provides a predetermined spacing apart between the first and second substrates as well surrounding each pixel-electrode. The dam member and the wall maintaining pattern are formed from a same material and protrude from a same one of the first and second substrates.

In an exemplary embodiment, the electrowetting display device further includes a sealing protecting pattern including a first protecting dam disposed at a first side of the sealing area and a second protecting dam disposed at an opposed second side of the sealing area.

In an exemplary embodiment, a height of the dam member is substantially the same as a height of the wall maintaining member.

In an exemplary embodiment, the first fluid layer includes a nonpolar (e.g., hydrophobic liquid) and the second fluid layer includes a polar (e.g., hydrophillic) liquid.

According to one aspect of the present disclosure of invention, during assembly of the electrowetting display device, an excessive amount of the wetting fluid is provided between the first and second substrates before they are squeezed together and against top and bottom sides of the sealant ring. The dam member has openings (spillways) through which an excess part of the wetting fluid is discharged as the first and second substrates are joined to each other by way of the sealant ring and at the same time the sealant closes up the openings. As a result of this assembly process, a bursting of the sealant due to excess pressure may be prevented and a cell gap of the wetting layer may be kept uniform over the whole of the display area. In addition, an adhesion surface area size between the dam member and the sealant may be increased by the opening parts so that an adhesive strength between the first and second substrates may be increased.

BRIEF DESCRIPTION OF THE DRAWINGS

The above and other features and advantages of the present disclosure of invention will become more apparent by describing in detailed exemplary embodiments thereof with reference to the accompanying drawings, in which:

FIG. 4A, FIG. 4B and FIG. 4C are cross-sectional views explaining one manufacturing method of the second substrate shown in FIG. 2;

FIG. 5A and FIG. 5B are cross-sectional views explaining one manufacturing method of the electrowetting display device in FIG. 1;

DETAILED DESCRIPTION

Hereinafter, the present disclosure of invention will be provided in greater detail with reference to the accompanying drawings.

Figure 1:
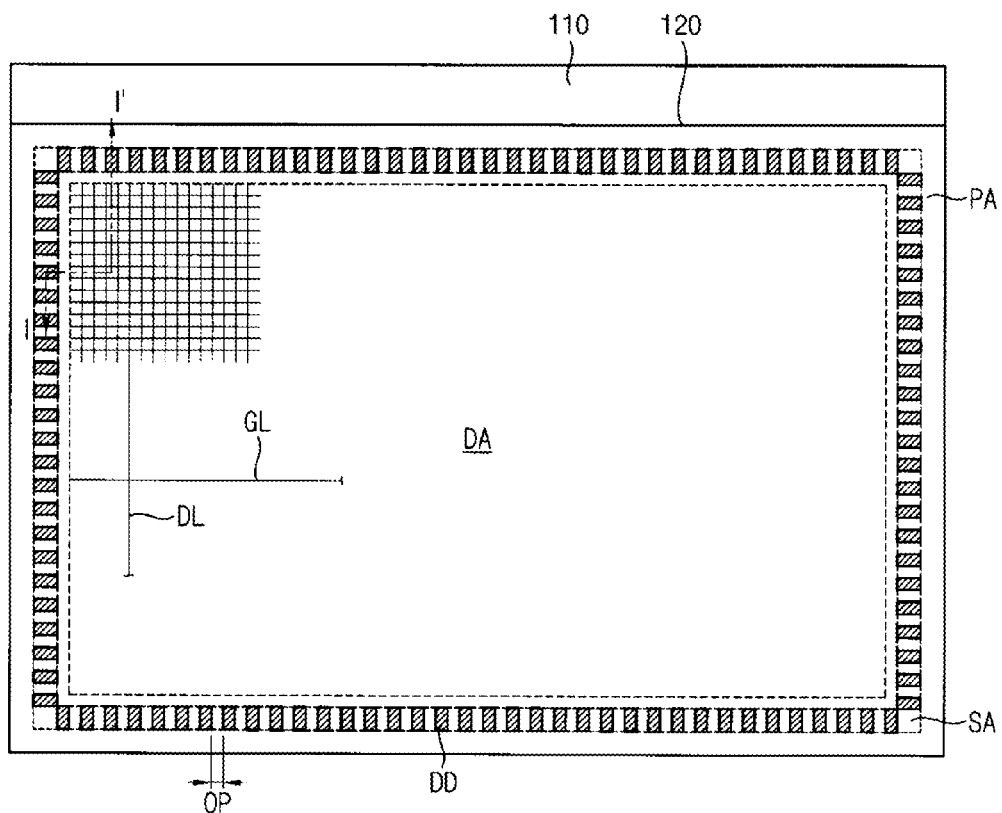
FIG. 1 is a plan view illustrating an exemplary embodiment of an electrowetting display device according to the present disclosure of invention.
Figure 2:
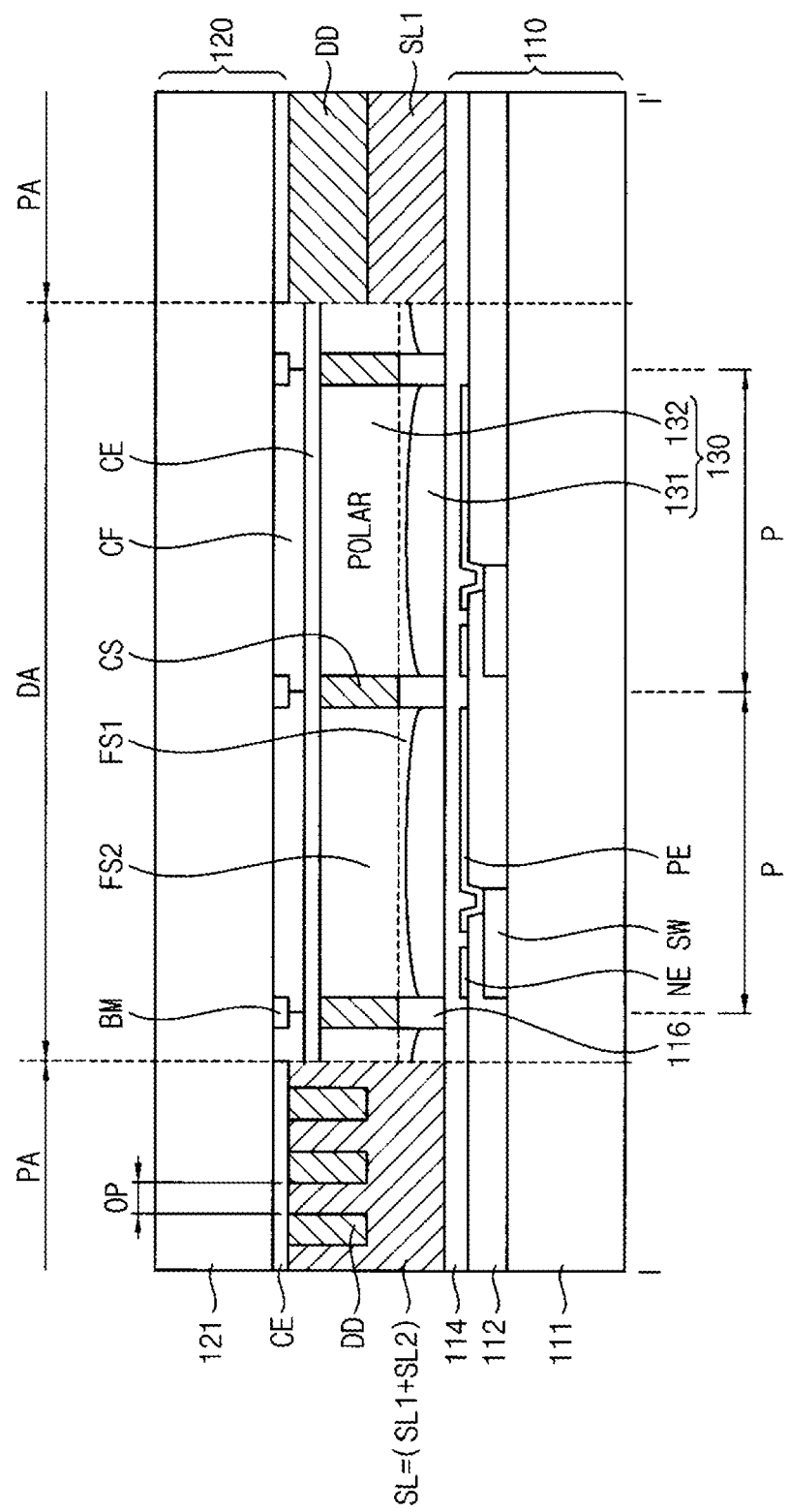
FIG. 2 is a cross-sectional view illustrating the electrowetting display device taken along line I-I' in FIG. 1.

FIG. 1 is a plan view illustrating an exemplary embodiment of an electrowetting display device according to the present disclosure. FIG. 2 is a cross-sectional view illustrating the electrowetting display device taken along line I-I' in FIG. 1.

Referring to FIGS. 1 and 2, the electrowetting display device includes a first substrate 110, a second substrate 120 and a wetting layer 130. The wetting layer 130 is disposed between the first and second substrates 110 and 120. The electrowetting display device includes a display area DA configured for displaying an image and a peripheral area PA surrounding the display area DA. The display area DA includes a plurality of pixel areas configured for displaying the image by an electrowetting displacement method and the peripheral area PA includes a sealing area SA in which a sealant is disposed for sealing in the wetting layer 130.

The first substrate 110 includes a first base substrate 111, a gate line GL, a data line DL, a switching element SW, a pixel electrode PE, a notch electrode NE, a wall pattern 116 and a sealant SL (which in one embodiment, may be composed of stacked portions SL1 and SL2 as shall be explained). The first substrate 110 further includes a first passivation layer 112 and a second passivation layer 114.

The gate line GL, the data line DL, the switching element SW, the pixel electrode PE, notch electrode NE and the wall pattern 116 are disposed in the display area DA of the first base substrate 111. The sealant SL is disposed in the sealing area SA of the first base substrate 111.

The gate line GL (one of a parallel many, only one shown) is extended in a first direction D1 and the data line DL (one of a parallel many, only one shown) is extended in a second direction D2 crossing the first direction D1. The switching element SW of each pixel is electrically connected to the pixel's corresponding gate line GL and to the pixel's corresponding data line DL.

The first passivation layer 112 is disposed on the first base substrate 111 on which the switching element SW is formed. The pixel electrode PE is disposed on the first passivation layer 112.

The pixel electrode PE is disposed in the pixel area P of the first base substrate 111 and is electrically connected to the switching element SW through a contact hole formed in the first passivation layer 112. Thus, a data voltage transferred through the data line DL may be applied to the pixel electrode PE when the corresponding gate line is activated for causing such transfer.

The notch electrode NE is disposed on the first passivation layer 112 and is disposed adjacent to the pixel electrode PE. The notch electrode NE may receive a substantially same voltage as a voltage applied to the common electrode 124 of the second substrate 120.

The second passivation layer 114 is disposed on the first base substrate 111 on which the pixel electrode PE and the notch electrode NE are formed. The second passivation layer 114 may have a hydrophobic upper surface so that, in a normal state, a correspondingly hydrophobic one (or otherwise nonpolar one, 131) of the two fluids (131, 132) is caused to spread out over (wet) the floor area of the hydrophobic upper surface of the second passivation layer 114 in its respective pixel cell area.

The wall pattern 116 is disposed on the second passivation layer 114. The wall pattern 116 (which can be rectangular or another closed shape when viewed from a top plan view) is disposed along (around) an edge of the pixel area P and forms a first filling space FS1.

The sealant SL (which in one embodiment, may be composed of stacked portions SL1 and SL2 as shall be explained) is disposed in the sealing area SA included in the peripheral area PA. The sealant SL, when fully cured, combines (bonds together) the first substrate 110 with the second substrate 120. However, during assembly, the sealant SL may be at least partially uncured and thus still soft and pliable such that relatively rigid protrusions DD of a dam member can be press inserted into the uncured sealant material.

The second substrate 120 includes a second base substrate 121, a light blocking pattern BM (black matrix), a color filter CF, a common electrode CE, a gap maintaining member CS and a dam member DD.

The blocking pattern BM is disposed on the second base substrate 121 and divides the second base substrate 121 into a matrix of light transmission areas and light blocking areas. An area in which the blocking pattern BM is disposed may be defined the blocking area and the blocking pattern BM overlaps with the wall pattern WP. The transmission area defined by the blocking pattern BM may correspond to the aperture of the pixel area. In addition, the blocking pattern BM may be disposed in the peripheral area PA of the second base substrate 121.

The color filter CF may be disposed in the pixel area P defined by the blocking pattern 122.

The common electrode CE is disposed on the second base substrate on which the color filter CF is formed. The common electrode CE is opposite to the pixel electrode PE and the notch electrode NE.

The gap maintaining member (spacer) CS overlaps with the blocking pattern BM and is disposed on the common electrode CE. The gap maintaining member CS overlaps with the wall pattern 116. The gap maintaining member CS uniformly maintains a gap between the first substrate 110 and the second substrate 120 and forms a second filling space FS2.

The dam member DD (which has relatively rigid protrusion also denoted as DD) is disposed in the peripheral area PA of the second base substrate 121 and, in one embodiment, rests on top of a lower portion SL1 of the sealant layers (SL1+SL2). The dam member DD includes a plurality of opening parts OP between its protrusion parts such as openings having a narrow slit shape. The size of the openings OP may depend on a viscosity of the second fluid layer 132 when the latter is being excessively filled into the devices during assembly and thereafter partly expelled by way of still-not-blocked parts of the openings OP (a.k.a. dam spillways). Basically, during assembly, the dam member DD functions as an intentionally leaky (but not too leaky) boundary member and the dam member DD is disposed as such an intentionally leaky boundary member in the peripheral area PA of the second base substrate 121 corresponding to the sealing area SA. The sealant SL disposed in the sealing area SA and an upper portion SL2 of the sealant SL may be progressively filled more and more into the opening parts OP of the dam member DD after the second fluid layer 132 is injected into the device during assembly and as excess portions of the second fluid layer 132 are expelled by way of still-unblocked portions of the dam spillways (openings OP).

More specifically, during the assembly process, the opening parts OP of the dam member DD operate as tiny passageways through which an excess portion of the wetting layer 130 is discharged to an outside as the first and second substrates are being joined to each other under pressure. The wetting layer 130 is initially filled in to a thicker height dimension than the predetermined gap between the first and second substrates 100 and 200 and the excess fluid spills out through the dam spillways defined by the opening parts OP as the first and second substrates are pressed together. Therefore, due to this last minute expulsion of excess fluid, the electrowetting display device may be prevented from being damaged by an excessive increasing of an internal pressure of the wetting layer 130 due to excess fluid being present when the first and second substrates are joined to each other under pressure. Examples of the damages caused by the excessive increasing of the internal pressure may include bursting of the sealant SL (in the case where there are no dam spillways OP), excessive bulging of a middle portion in the display area of the electrowetting display device due to excess fluid being retained there and so on.

As mentioned, the wetting layer 130 includes a first fluid layer 131 such as a dyed (e.g., black) hydrophobic liquid (e.g., a dark colored oil) and a second fluid layer 132 such as a clear (e.g., transparent) hydrophillic liquid.

The first fluid layer 131 is disposed in a lower layer region between the first and second substrates 110 and 120 and is filled in the first filling space FS1 formed by the wall pattern 116 (where the outer surfaces of wall pattern 116 and the upper surface of second passivation layer 114 are nonpolar (e.g., hydrophobic)). For example, the hydrophobic first fluid layer 131 may be a black-dyed nonpolar organic liquid (e.g., an oil). The polar (e.g., hydrophillic) second fluid layer 132 is normally disposed in an upper layer region between the first and second substrates 110 and 120 and is filled in the second filling space FS2 formed by the gap maintaining member CS. This is the normal state of the polar (e.g., hydrophillic) second fluid layer 132 because it is repelled by the nonpolar (e.g., hydrophobic) surface portion of the wall pattern 116 and of the second passivation layer 114 s well as by the nonpolar (e.g., hydrophobic) first fluid layer 131.

The state shown in FIG. 2 is the normal state wherein there is no potential difference between the common electrode 124 and the pixel electrode PE. Then, under this electric field free condition, the nonpolar first fluid layer 131 is relaxed and wets the nonpolar (e.g., hydrophobic) walls in the first filling space FS1 and thus generally spreads out uniformly in the pixel area P in which the pixel electrode PE and the notch electrode NE are formed. Thus, a light transmitted from the second substrate 120 is blocked by the darkly-dyed first fluid layer 131 so that the pixel area P may display an image having a black gray scale. However, when a potential difference (voltage) of adequate magnitude is formed between the common electrode 124 and the pixel electrode PE, the field-attracted second and polar fluid layer 132 is pulled into the first filling space FS1 to thereby displace the hydrophobic first fluid layer 131 from that area so that the latter one (131) gathers toward the wall pattern 116 adjacent to the notch electrode NE in the pixel area. A size of the gathered the first fluid layer 131 is changed according to the potential difference voltage so that a transmittance of the light transmitted from the second substrate 120 may be changed. Thus, the pixel area P may display images having various gray scales.

Figure 3:
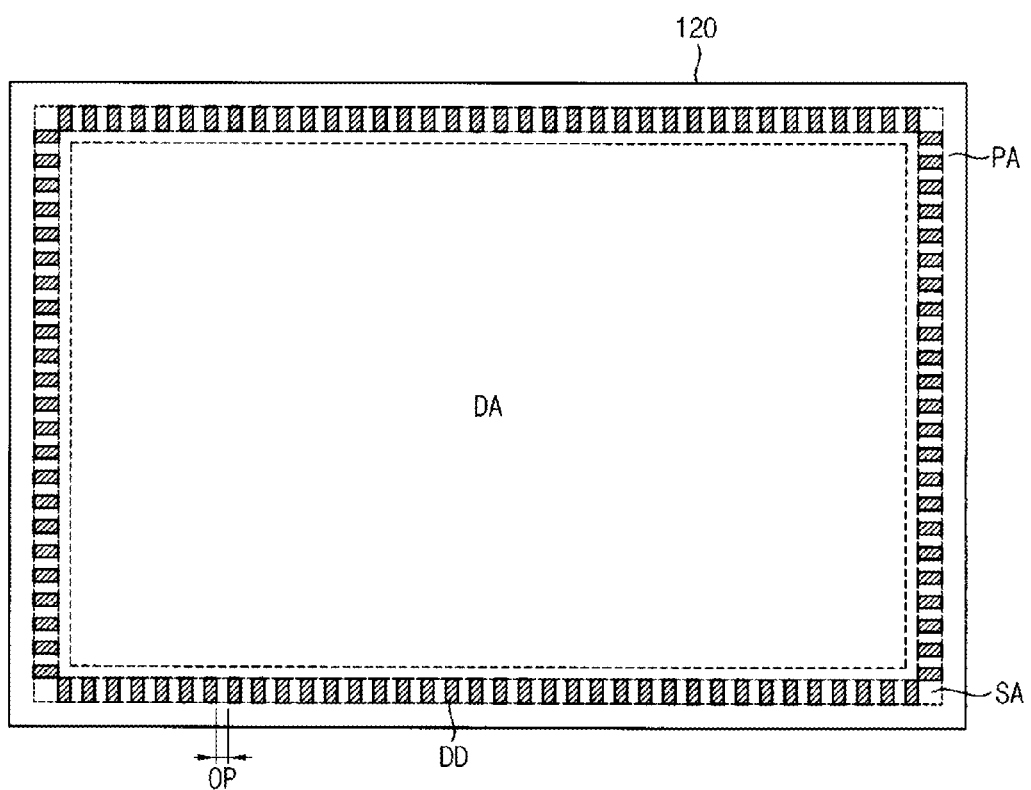
FIG. 3 is a plan view illustrating a second substrate in FIG. 2.

FIG. 3 is a plan view illustrating just the second substrate 120 of FIG. 2.

Referring to FIGS. 2 and 3, the dam member DD is disposed in the peripheral area PA of the second substrate 120. For example, the dam member DD may be disposed in the sealing area SA.

The dam member DD is disposed to define a slightly leaky enclosure along the four side edges of the display area DA such as a quadrangular shape. The dam member DD includes between its relatively rigid protrusions, a plurality opening parts OP such as those having the narrow slit shape. For example, each of opening parts has a width of about 0.03 mm to about 1 mm. The dam member DD may have the substantially same height dimension as a height of the gap maintaining member CS. The gap maintaining member CS (e.g., protruding spacer poles) and the protrusions of the dam member DD may respectively each have a respective height dimension of about 15 μm. As will be better understood in conjunction with the embodiment state shown in FIG. 5B, the height dimension of the dam member DD comes to rest on top of the height dimension of a lower layer portion SL1 of the sealant and subsequently, after excess amounts of the second fluid 132 are released through the spillways (OP), the upper layer portion SL1 of the sealant is added and/or cured.

The opening parts OP of the dam member DD operate as the passageways (spillways) through which the excess amounts of the wetting layer 130 are discharged to the outside during the pressure driven joining together (combining) of the first and second substrates 110, 120. Therefore, the electrowetting display device may be prevented from being damaged by an excess increasing in an internal pressure of the wetting layer 130. Examples of the damages caused by the increasing the internal pressure may include burst of the sealant SL, bulging of a middle portion in the display area of the electrowetting display device and so on. According to the present exemplary embodiment, the electrowetting display device after the combination process being finished may have the wetting layer 130 of a uniform thickness and the right amount of fluid volume for it as needed by the predetermined filling spaces (FS1 plus FS2) of the device.

The dam member DD may be formed in the sealing area SA via a process substantially the same as, and using substantially same materials as that of forming the gap maintaining member CS disposed in the display area DA.

Figure 4A:
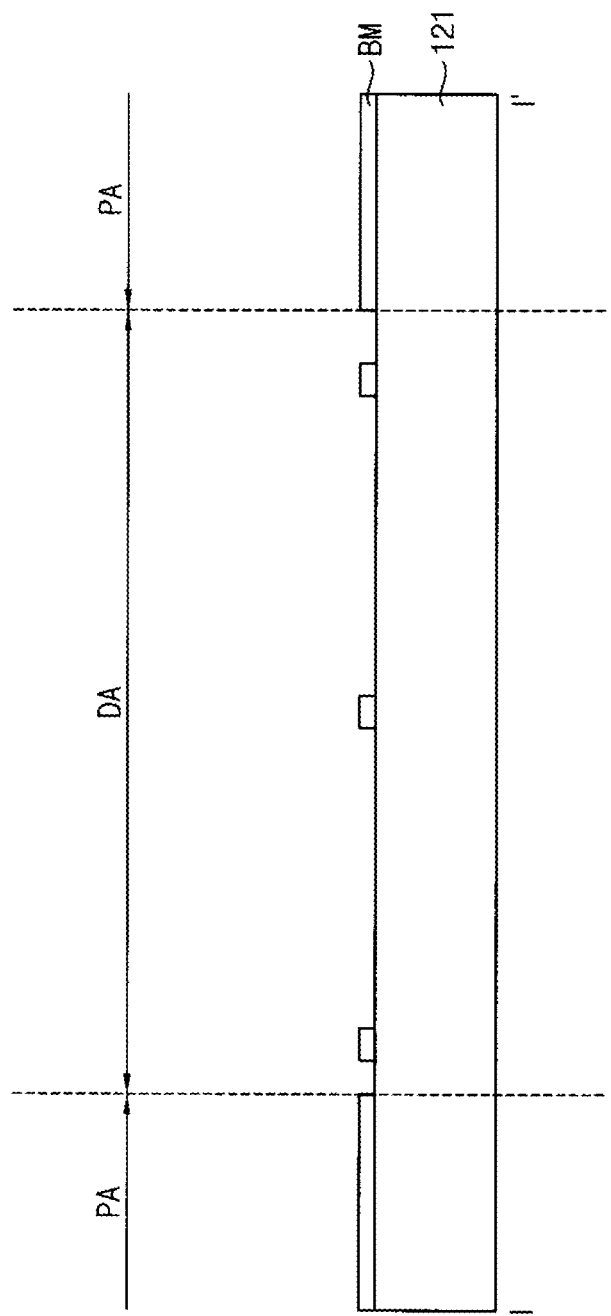

FIG. 4A, FIG. 4B and FIG. 4C are cross-sectional views explaining one manufacturing method of the second substrate shown in FIG. 2. (It is to be understood that that the display area DA is generally much wider and has many more pixel areas across it and that the illustrated cross over from the display area DA to the surrounding peripheral area PA is schematic in nature and in particular the discontinuity illustrated in FIG. 4B for the common electrode layer CE is schematic in nature whereas in actuality a smoother transition of vertical position is provided for.)

Referring to FIGS. 2 and 4A, a light blocking material layer is blanket formed on a base substrate 121. The blocking layer is patterned into the matrix-like blocking pattern BM. The blocking pattern BM aligns with the wall pattern 116 in the display area DA and may be generally formed in the peripheral area PA.

Referring to FIGS. 2 and 4B (where these are schematic in nature), a colored photoresist layer is formed on the base substrate 121 on which the blocking pattern BM is formed. The colored photoresist layer is patterned into the correspondingly colored filter CF and the color filter CF is formed in an area corresponding to the pixel area P of the base substrate 121. After plural runs, the color filter CF may include red, green and blue filters.

The common electrode CE is blanket formed on the base substrate 121 on which the color filter CF is formed. The common electrode CE may include a transparent conductive material such as ITO or IZO. The common electrode CE may be formed in only the display area DA or in all the display area DA and the peripheral area PA. Not shown in figures, an over coating layer may be formed on the base substrate 121 on which the color filter CF is formed so as to flatten (planarize) the second substrate 120.

Referring to FIGS. 2 and 4C, an organic layer is formed to a predetermined thickness on the base substrate 121 on which the common electrode CE is formed, the predetermined thickness being at least as thick as the planned height dimensions of the spacers CS and of the spaced apart dam portions (spaced apart by OP). The organic layer is patterned into the gap maintaining members CS in the display area DA and the dam member portions DD in the peripheral area PA.

The gap maintaining members CS overlaps with and align with the wall pattern 116 of the first substrate 110.

The dam member DD is formed in the peripheral area PA of the base substrate 121 corresponding to the sealing area SA of the first substrate 110. The dam member DD may be formed along at least one of four edges of the display area DA. For example, the dam member DD may be formed along all four edges of the display area DA. In an alternate embodiment, the entire periphery of the dam does not have to be leaky (due to openings OP) and instead such openings are provided in only a portion of the formed dam.

The dam member DD may have the substantially same height as a height of the gap maintaining member CS. For example, the dam member DD may have the height of about 15 μm.

The dam member DD includes the opening parts OP such as the slit shapes. The width of the opening parts OP may be set based on a combination of desired discharge speed, viscosity and the excess thickness of the wetting layer excessively formed in the combination process. For example, the width of the opening part OP may be about 0.03 mm to about 1.0 mm.

Figure 5B:
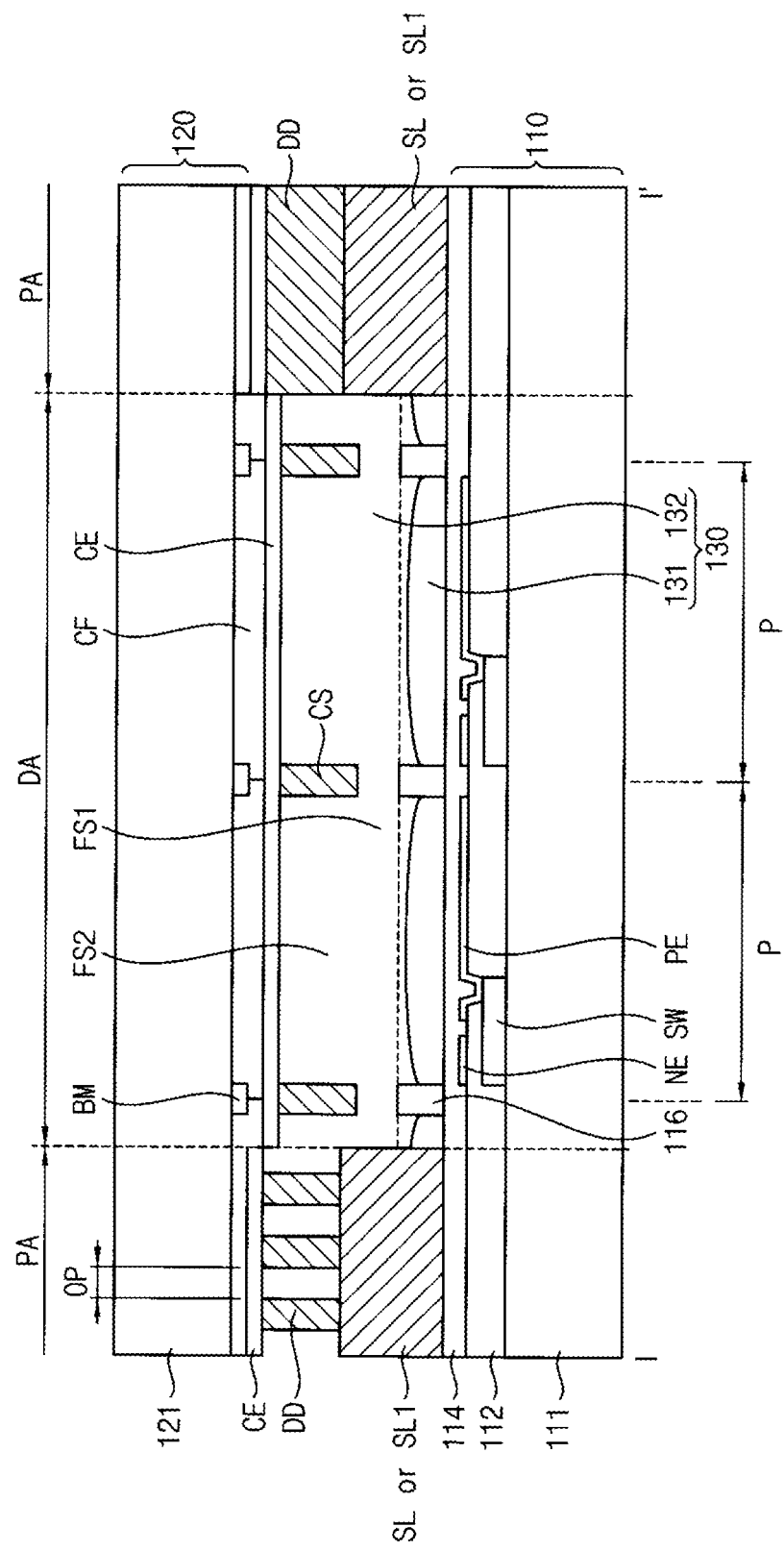

FIG. 5A and FIG. 5B are cross-sectional views explaining one manufacturing method of the electrowetting display device in FIG. 1.

Referring to FIG. 5A, the first substrate 110 includes a pixel area P disposed in the display area DA. In the pixel area P, a switching element SW, a pixel electrode PE, a notch electrode NE and a wall pattern 116 are disposed.

A partial sealant SL1 or a still not fully cured and thus tacky, full height SL is formed in the peripheral area PA of the first substrate 110. The sealant SL (or SL1) is disposed in the sealing area SA of the first substrate 110.

The second substrate 120 includes the gap maintaining member CS formed in the display area DA and the dam member DD formed in the peripheral area PA.

After the partial sealant SL1 or a still not fully cured and thus tacky, full height sealant SL is formed on the first substrate 110, the first fluid layer 131 is formed (deposited) in the first filling spaces (cavities) FS1 formed by the wall pattern 116. The second fluid layer 132 is thereafter formed (deposited) on the first substrate 110 on which the first fluid layer 131 is formed. The second fluid layer 132 is full formed to an excess amount on the first substrate 110.

A process method by which the first and second fluid layers 131 and 132 are formed on the first substrate 110 may be various depending on viscosities, surface tension effects and so on.

For example, after the first substrate 110 is put in a bath, a first fluid such as the oil is put in the bath. Then, a second fluid such as an electric field movable electrolyte is filled in the bath. Thus, the first fluid layer 131 is filled in the first filling space FS1 formed by the wall pattern 116 and the second fluid layer 132 is fully formed to an excess amount on the first substrate 110 to cover the first fluid layer 131.

Alternatively, using a coating method, the first and second fluid layers 131 and 132 may be formed. According to the coating method, a first fluid such as the oil is dropped (e.g., ink jet wise) in the first filling space FS1 formed by the wall pattern 116 on the first substrate 110 so that the first fluid layer 131 is formed in the pixel area P. Using a slit coating, a second fluid such as a hydrolyte is formed to a thick thickness on the first substrate 110 on which the first fluid layer 131 is formed.

Alternatively, using a dual slit method, the first and second fluid layers 131 and 132 may be formed on the first substrate 110 at the same time. For example, a first inkjet head drops the first fluid layer 131 in the first filling space FS1. A second inkjet head moves following the first inkjet head and drops the second fluid layer 132 to a thick thickness on the first substrate 110 on which the first fluid layer 131 is formed.

As described above, the first and second fluid layers 131 and 132 may be formed on the first substrate 110 by various methods.

Referring to FIG. 5B, using the combination process, the second substrate 120 formed the gap maintaining member CS and the dam member DD is combined with the first substrate 110. In this case, the sealant SL may be formed in various ways including pre-hardening a lower layer portion SL1 as pre-bonded to the first substrate 110 and then adding a not-yet fully hardened upper layer portion SL2 into which the more rigid dam member protrusions are going to be pushed at the same time that excess fluid 130 is discharged through what remains as unblocked (still open but diminishing in size of non-blockage) dam openings OP.

In one embodiment, when the second substrate 120 is combined with the first substrate 110, the dam member DD is combined with (pushed into) the still uncured top portion of the sealant SL and the gap maintaining member CS is combined with (makes contact with) the wall pattern 116. When the first and second substrates 110 and 120 are combined with each other, the second fluid layer 132 fully formed is discharged to the outside through what is left of the diminishing in size unblocked portions of the opening parts OP of the dam member DD. Therefore, the electrowetting display device may be prevented from being damaged by increasing an internal pressure of the wetting layer 130, such as burst of the sealant SL, bulging of a middle portion in the display area of the electrowetting display device and so on.

When a combination of the first and second substrates 110 and 120 is finished, the remainder of the sealant SL (e.g., at least the still tacky upper part) is filled into the disappearing opening areas OP of the dam member DD to fully adhere to and seal up the dam member DD so that an adhesion of the first and second substrates 110 and 120 is finished. By the sealant SL being filled to cover the protrusion surface areas between the opening parts OP, an adhesion size between the first and second substrates 110 and 120 may be increased so that an adhesive strength between the first and second substrates 110 and 120 may be increased. The curing of the sealant SL is then driven to completion if so desired at this stage of manufacture.

Figure 6:
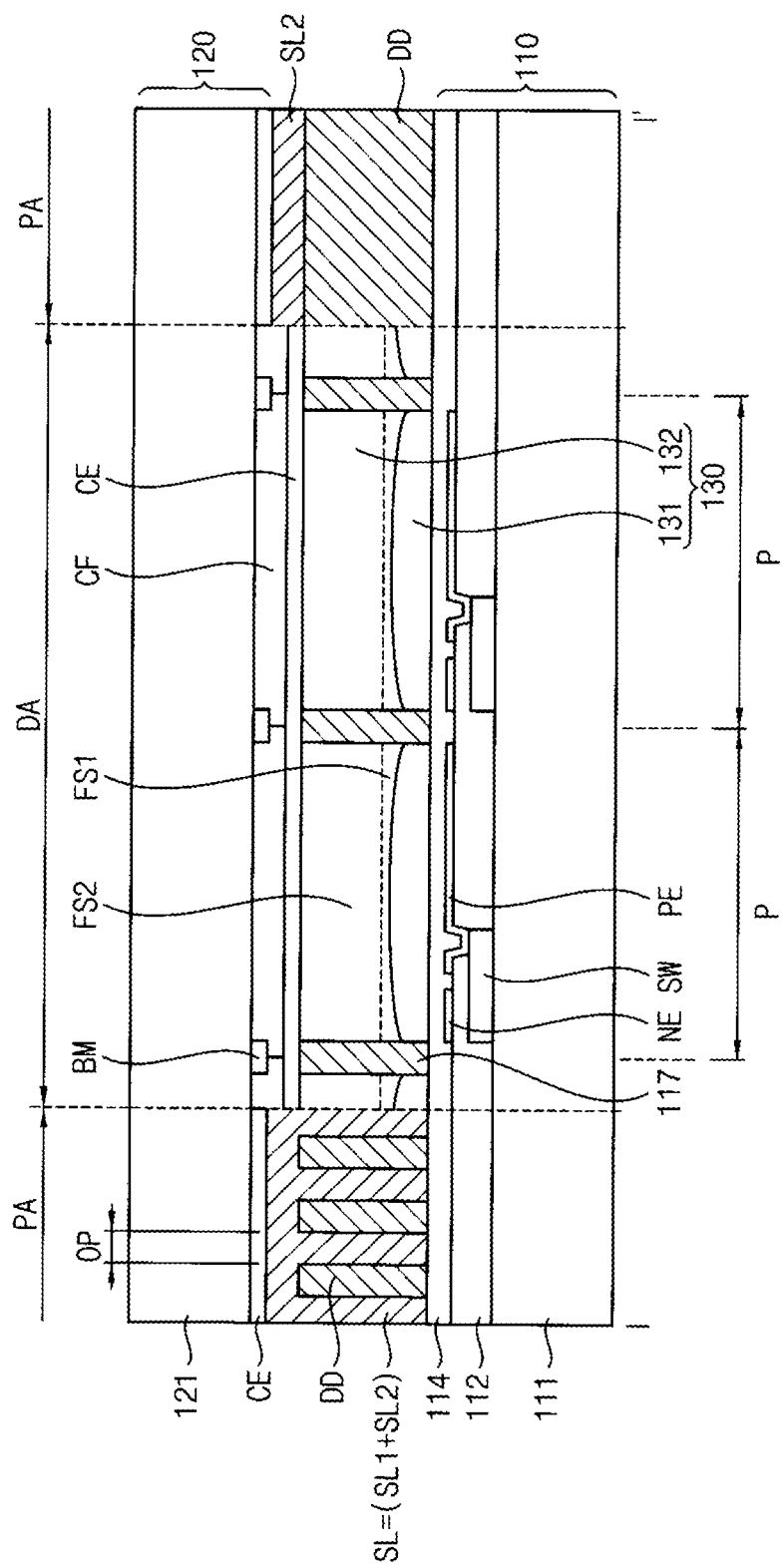
FIG. 6 is a cross-sectional view illustrating an electrowetting display device according to another exemplary embodiment.
Figure 7:
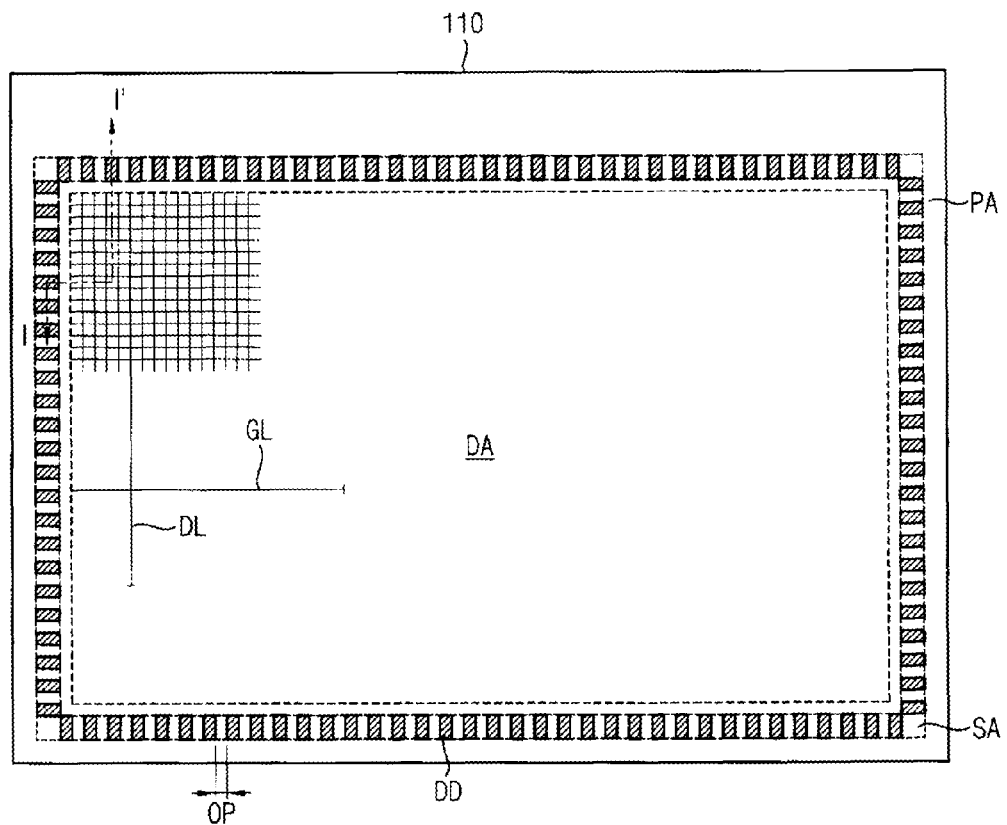
FIG. 7 is a plan view illustrating a first substrate in FIG. 6.

FIG. 6 is a cross-sectional view illustrating an electrowetting display device according to another exemplary embodiment in accordance with the present disclosure of invention. FIG. 7 is a plan view illustrating a first substrate in FIG. 6.

Hereinafter, the same reference numerals are used to refer to the same or like parts as those described in the previous exemplary embodiments, and the same detailed explanations are omitted or simplified.

Referring to FIGS. 6 and 7, the electrowetting display device includes a first substrate 110, a second substrate 120 and a wetting layer 130.

The first substrate 110 includes a first base substrate 111, a gate line GL, a data line DL, a switching element SW, a pixel electrode PE, a notch electrode NE, a wall maintaining pattern 117 and a dam member DD. The first substrate 110 further includes a first passivation layer 112 and a second passivation layer 114.

The wall maintaining (spacers plus cavity formation) pattern 117 according to the present exemplary embodiment, replace and thus perform substantially same functions as those of the wall pattern 116 and of the gap maintaining pattern CS according to the previously exemplary embodiment shown in FIG. 2 except that here the dam protrusions DD and the wall maintaining pattern 117 arise from the first substrate 111 rather than descending from the second substrate 120.

The wall maintaining pattern 117 is disposed along edges of the pixel area P to form a filling space (first fluid containing cavity) corresponding to the pixel area. The wetting layer 130 is filled in the filling space. The wetting layer 130 is the substantially same as that of the previously exemplary embodiment. The wetting layer 130 may include a first fluid layer 131 such as a dark colored and non-polar oil and a second fluid layer 132 such as a polar electrolyte covering the first fluid layer 131.

A height of the wall maintaining pattern 117 is substantially the same as the sum of the heights of the wall pattern 116 and the gap maintaining pattern CS according to the previously exemplary embodiment shown in FIG. 2. For example, the height of the wall maintaining pattern 117 may be about 19 μm to about 20 μm.

The dam member DD according to the present exemplary embodiment is disposed in the peripheral area PA of and attached to the first base substrate 111. For example, the dam member DD is disposed in the sealing area SA included in the peripheral area PA of the second substrate.

The dam member DD may be disposed along at least one of four edges of the display area DA. For example, the dam member DD may be disposed along all four edges of the display area DA.

The dam member DD includes a plurality of opening parts OP such as a slit shape, and has the height being substantially same as the height of the wall maintaining pattern 117. For example, the dam member DD may have the height of about 19 μm to about 20 μm.

The opening part OP of the dam member DD may be filled by the sealant SL disposed in the sealing area SA. In the combination process, the opening parts OP of the dam member DD become passages through which the wetting layer 130 formed thicker than the predetermined gap between the first and second substrates 100 and 200 is discharged to an outside as the first and second substrates are brought together during assembly. Therefore, the electrowetting display device may be prevented from being damaged by increasing an internal pressure of the wetting layer 130, such as burst of the sealant SL, bulging of a middle portion in the display area of the electrowetting display device and so on. The width of the opening part OP may be set so as to smoothly discharge the excess portion of the wetting layer 130 based on a combination speed and the thickness of the wetting layer excessively formed in the combination process. For example, the width of the opening part OP may be about 0.03 mm to about 1 mm.

According to the present exemplary embodiment, the second substrate 120 includes a second base substrate 121, a blocking pattern BM, a color filter CF and a common electrode CE. The sealant SL according to the present exemplary embodiment is disposed so as to be aligned with the sealing area SA included in the peripheral area PA of the second base substrate 121.

Figure 8A:
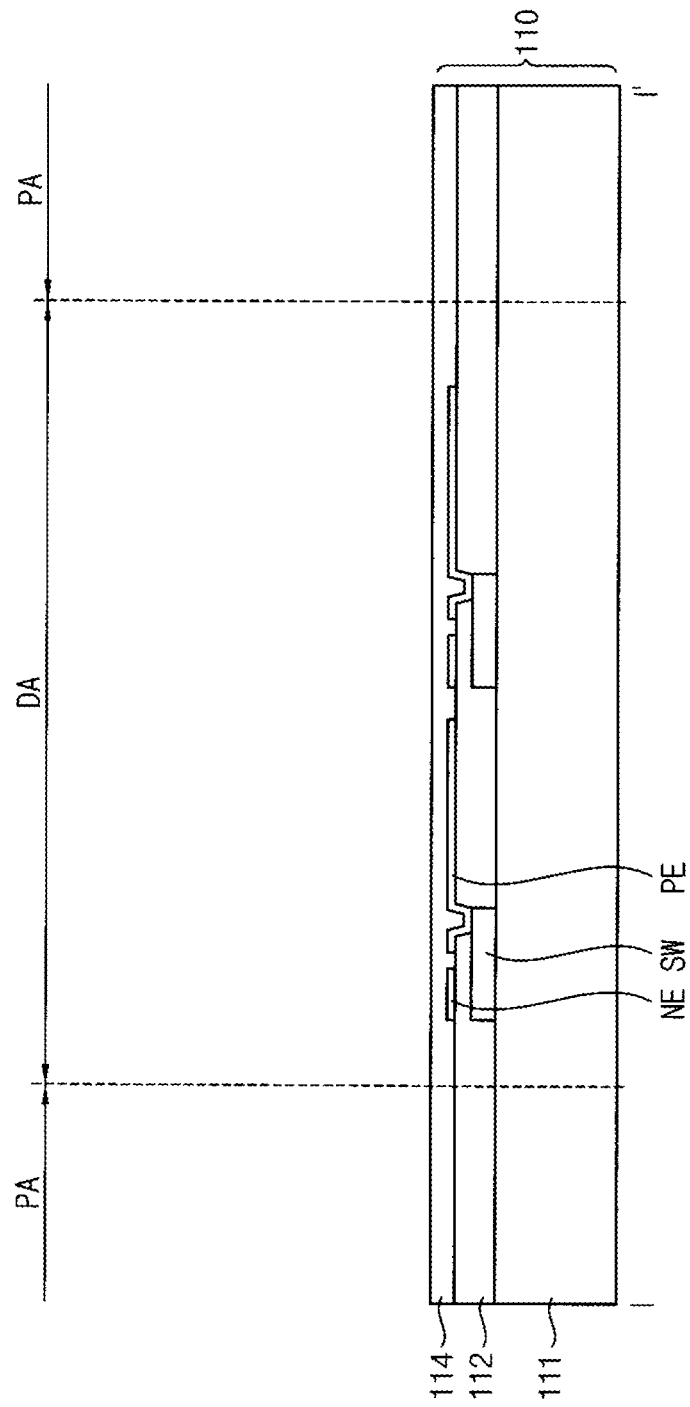
FIG. 8A and FIG. 8B are cross-sectional views explaining one manufacturing method of the first substrate shown in FIG. 6.
Figure 8B:
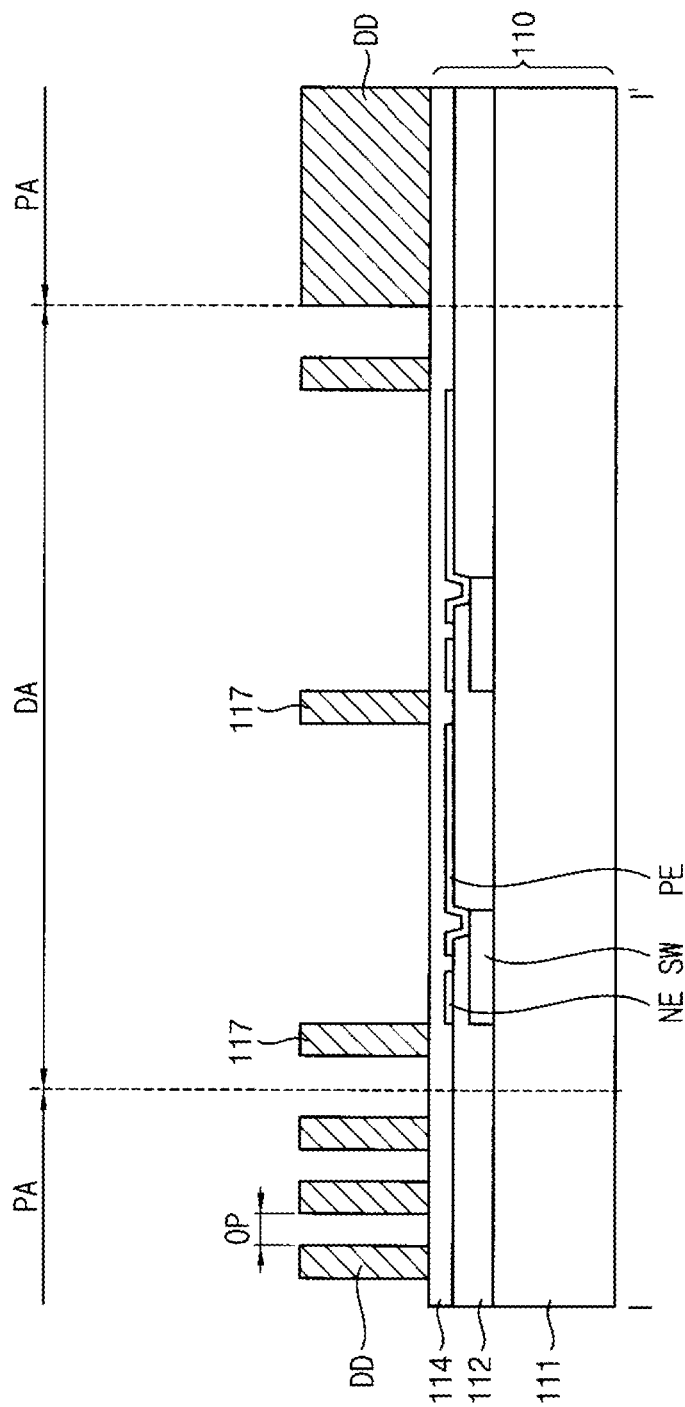

FIG. 8A and FIG. 8B are cross-sectional views explaining one manufacturing method of the first substrate shown in FIG. 6.

Referring to FIGS. 7 and 8A, the switching element SW is formed on the base substrate 111 and the switching element SW is connected to the gate line GL and the data line DL. The first passivation layer 112 is formed on the base substrate 111 on which the switching element SW is formed and a contact hole is formed in the first passivation layer 112. The pixel electrode PE and the notch electrode are formed on the first passivation layer 112. The pixel electrode PE is electrically connected to the switching element SW through the contact hole.

Referring to FIGS. 7 and 8B, the second passivation layer 114 (e.g., having a surface that is wettable by a nonpolar liquid 131) is formed on the base substrate 111 on which the pixel electrode PE and the notch electrode NE are formed.

An organic layer is formed on the base substrate 111 on which the second passivation layer 114 is formed. The organic layer is patterned into the wall maintaining pattern 117 in the display area DA and the dam member DD in the peripheral area PA. The organic layer may be transparent or opaque.

The wall maintaining pattern 117 is disposed along edge of the pixel area P defined on the base substrate 111 to form the filling space.

The dam member DD may be disposed along at least one of four edges of the display area DA. For example, the dam member DD may be disposed along all four edges of the display area DA. The dam member DD includes a plurality of opening parts OP between its relatively rigid protrusions and the width of the opening parts OP may be set so as to smoothly discharge the excess wetting layer 130 based on a combination speed and the thickness of the wetting layer excessively formed in the combination process. For example, the width of the opening part OP may be about 0.03 mm to about 1 mm.

The height of the wall maintaining pattern 117 is the substantially same as the height of the dam member DD. For example, the wall maintaining pattern 117 and the dam member DD may have the height of about 19 μm to about 20 μm.

According to the present exemplary embodiment, the wall maintaining pattern 117 and the dam member DD are formed using the relatively thick organic layer first deposited as a single layer structure and thereafter patterned. However, not shown in the figures, the wall pattern of a first thickness may be formed in the he display area DA using a first organic layer of the first thickness. Then, the gap maintaining pattern of a second thickness may be formed on the wall pattern of the first thickness using a second organic layer of the second thickness and the dam member DD of the second thickness may be formed in the peripheral area PA using the second organic layer of the second thickness. Thus, the wall maintaining pattern 117 in the display area DA may have a double layer structure comprising the wall pattern of the first thickness and the gap maintaining pattern of the second thickness. The dam member DD of the second thickness in the peripheral area PA may have the single layer structure.

According to the present exemplary embodiment, when the dam member DD is combined with the sealant SL (which is at least partially uncured in areas where the dam protrusions are driven into the sealant) and the gap maintaining member CS is combined with the wall pattern 116 in the combination process, the excess part of the wetting fluid 130 which was intentionally excessively filled into the upper filling space FS2, is discharged to the outside through the opening parts OP of the dam member DD as the first and second substrates are brought into union with one another. Therefore, the electrowetting display device may be prevented from being damaged by increasing an internal pressure of the wetting layer 130. Examples of the damages caused by the increasing the internal pressure may include burst of the sealant SL, bulging of a middle portion in the display area of the electrowetting display device and so on. In addition, an adhesion size between the dam member DD and the sealant SL may be increased due to increased surface area created by the opening parts OP so that an adhesive strength between the first and second substrates 110 and 120 may be increased.

Figure 9:
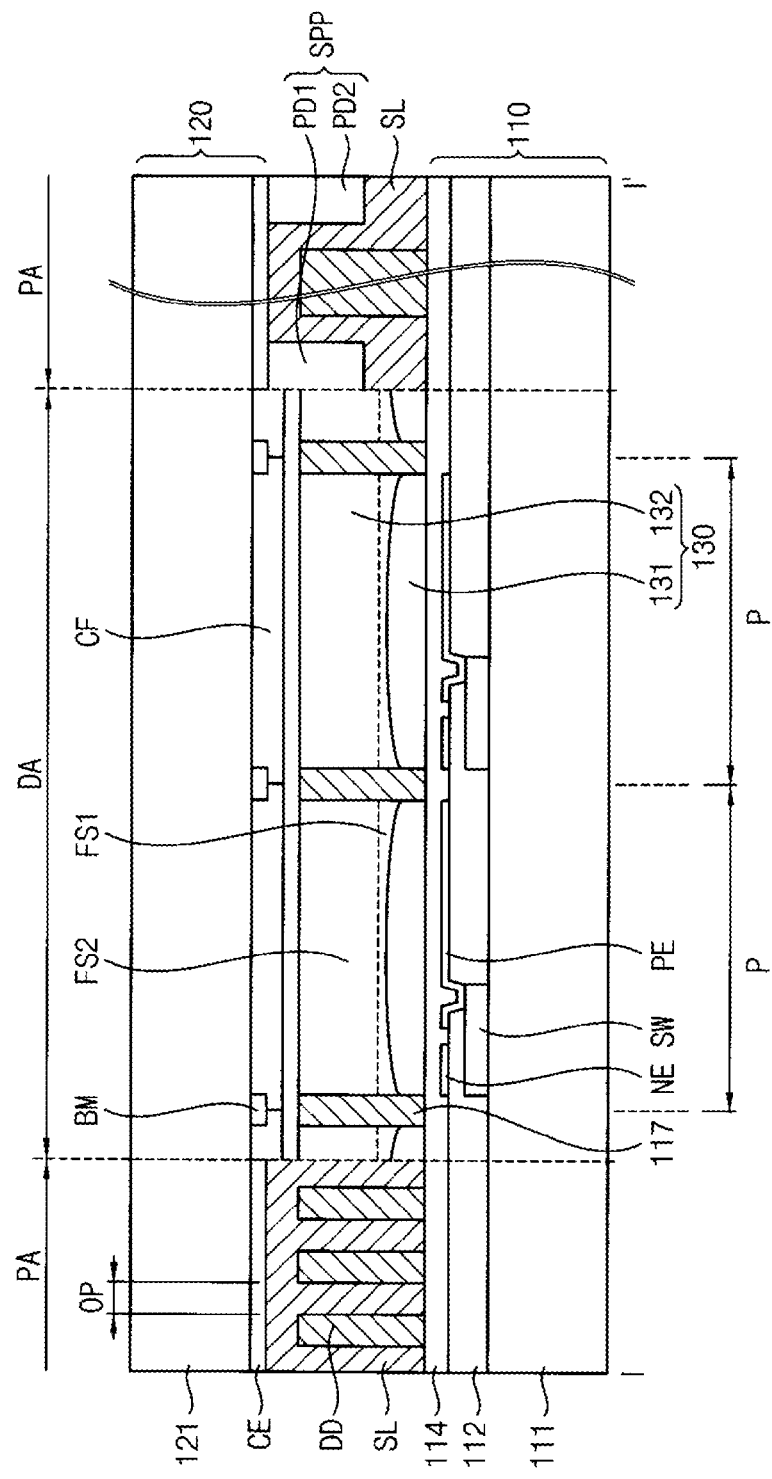
FIG. 9 is a cross-sectional view illustrating an electrowetting display device according to another exemplary embodiment.
Figure 10:
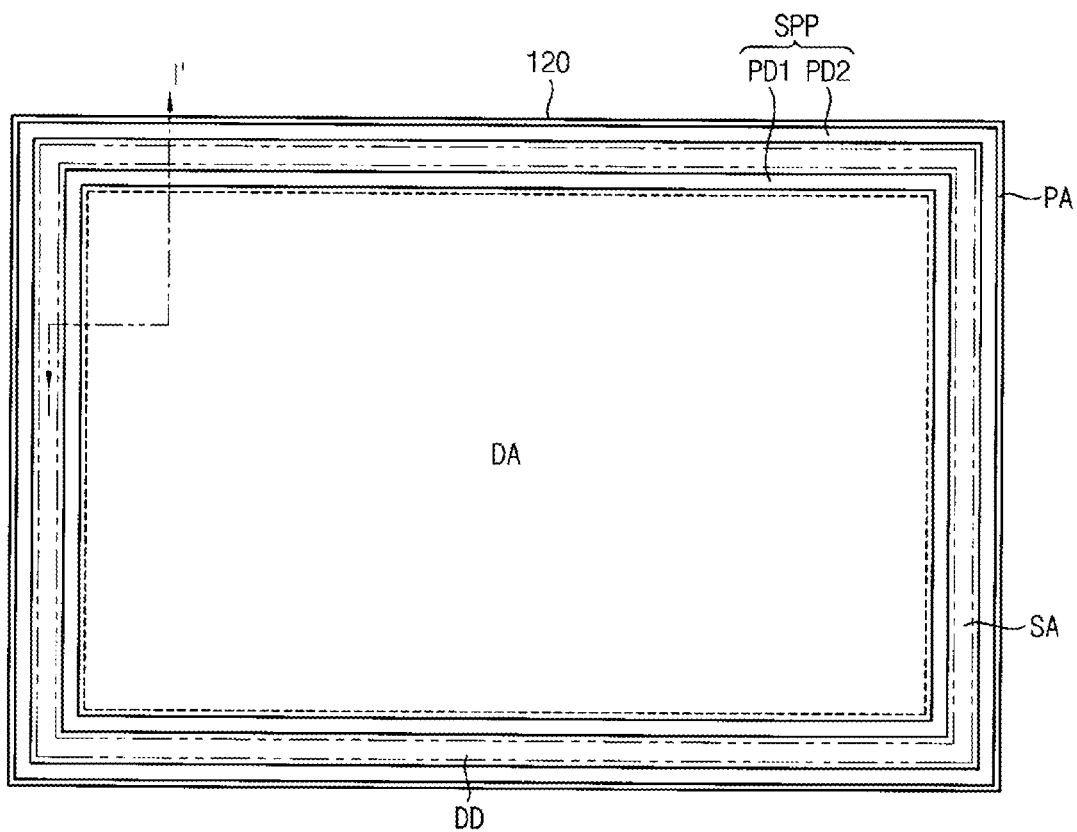
FIG. 10 is a plan view illustrating a first substrate in FIG. 9.

FIG. 9 is a cross-sectional view illustrating an electrowetting display device according to yet another exemplary embodiment. FIG. 10 is a plan view illustrating a first substrate in FIG. 9.

Hereinafter, the same reference numerals are used to refer to the same or like parts as those described in the previous exemplary embodiments, and the same detailed explanations are omitted or simplified.

The electrowetting display device according to the present exemplary embodiment further includes a sealing protecting pattern in compare with the electrowetting display device according to the previously exemplary embodiment shown in FIG. 6.

The electrowetting display device according to the present exemplary embodiment includes a first substrate 110, a second substrate 120 and a wetting layer 130.

The first substrate 110 is the substantially same as that of the previously exemplary embodiment shown in FIGS. 6 and 7.

The second substrate 120 according to the present exemplary embodiment includes a second base substrate 121, a blocking pattern BM, a color filter CF, a common electrode CE and a sealing protecting pattern SPP whose cross sectional shape may be seen in FIG. 9.

The sealing protecting pattern SPP is disposed in the peripheral area PA of the second base substrate 121. For example, the sealing protecting pattern SPP includes a first protecting (non-leaky) dam PD1 and a second protecting (non-leaky) dam PD2. The first protecting dam PD1 is disposed between the display area and the sealing area SA and is disposed along a first side portion of the sealing area SA. The second protecting dam PD2 is disposed adjacent to a second side portion of the sealing area SA and is disposed along the second side portion of the sealing area SA. The sealing protecting pattern SPP may be disposed along at least one of four edges of the sealing area SA. For example, the sealing protecting pattern SPP may be disposed along all four edges of the sealing area SA. A height of the sealing protecting pattern SPP may be equal to or less than the predetermined gap between the first and second substrates 110 and 120.

The sealing protecting pattern SPP may be used to prevent a bursting of the still-uncured, at least upper part of the sealant SL as the leaky dam protrusions DD are pushed into that portion of the sealant SL. The cross sectional shapes shown in FIG. 9 are exemplary and of course other shapes including tapered ones may be used.

According to the exemplary embodiments of the present disclosure of invention, in the process of bringing the first and second substrates into union with one another, an excess portion of the wetting layer is discharged to the outside through the opening parts of the dam member so that a sealant burst may be prevented and a cell gap of the wetting layer may be kept of uniform dimension across the whole of the display area (DA). In addition, an adhesion surface size between the dam member and the sealant may be increased by the opening part so that an adhesive strength between the first and second substrates may be increased.

The foregoing is illustrative of the present disclosure of invention and is not to be construed as limiting thereof. Although a few exemplary embodiments of the present teachings have been described, those skilled in the art will readily appreciate from the foregoing that many modifications are possible in the exemplary embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. An electrowetting display device comprising:
   a first substrate including a wall pattern forming a liquid-retaining cavity surrounding a pixel electrode disposed in a display area of the first substrate;
   a second substrate including a common electrode disposed for forming an electric field with the pixel-electrode of the first substrate;
   a dam member disposed in a peripheral area of at least one of the first and second substrates, the peripheral area surrounding the display area, where the dam member defines one or more sealable openings;
   a sealant disposed in the peripheral area, disposed between the first substrate and the second substrate, and filling the sealable openings of the dam member; and
   a wetting fluid disposed between the first and second substrates, the wetting fluid comprising a first fluid layer and a second fluid layer, wherein the first fluid layer comprises a nonpolar liquid and the second fluid layer comprises a polar liquid.

2. The electrowetting display device of claim 1, wherein the dam member has a polygon shape including sides disposed in areas corresponding to four edges of the display area.

3. The electrowetting display device of claim 1, wherein the one or more sealable openings each has a width of about 0.03 mm to about 1 mm.

4. The electrowetting display device of claim 1, wherein the sealant is disposed in the peripheral area and bonds the first and second substrates to each other.

5. The electrowetting display device of claim 4, wherein the dam member is disposed in an area corresponding to a sealing area in which the sealant is disposed.

6. The electrowetting display device of claim 1, further comprising:
   a gap maintaining member structured for maintaining a predetermined gap between the first substrate and the second substrate.

7. The electrowetting display device of claim 6, wherein the gap maintaining member is disposed in the display area and alignably overlaps with the wall pattern.

8. The electrowetting display device of claim 7, wherein a height of the dam member is substantially the same as a height of the gap maintaining member.

9. The electrowetting display device of claim 8, wherein the first fluid layer is disposed in a filling space formed by the wall pattern and the second fluid layer is disposed in a filling space maintained by the gap maintaining member.

10. The electrowetting display device of claim 1 wherein the dam member comprises dam member portions spaced apart from one another by the one or more sealable openings.

11. The electrowetting display device of claim 1 wherein the one or more sealable openings extend through the dam member in a direction parallel to a plane of the first substrate.

12. The electrowetting display device of claim 1 wherein the dam member and the sealant are located directly between the first substrate and the second substrate.

\* \* \* \* \*